2,281,977

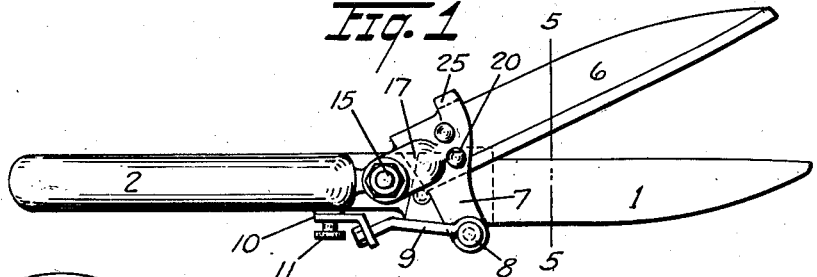
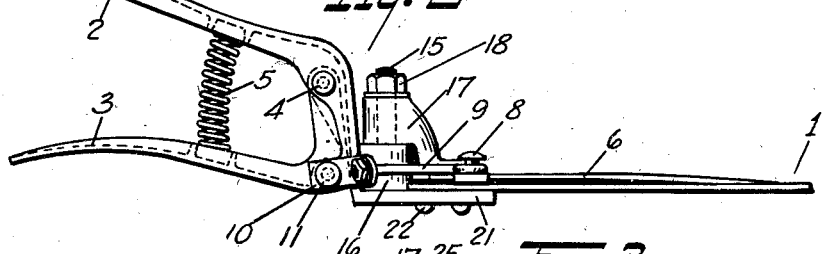
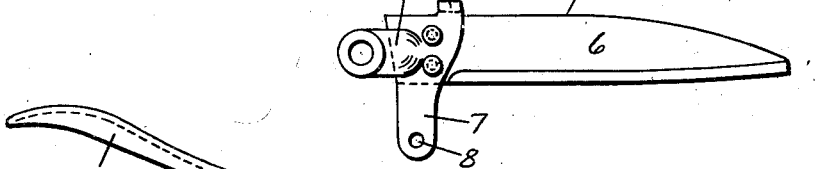
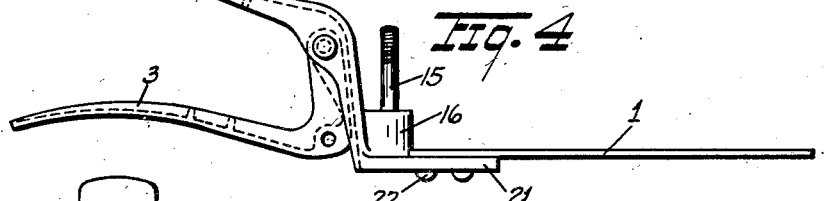
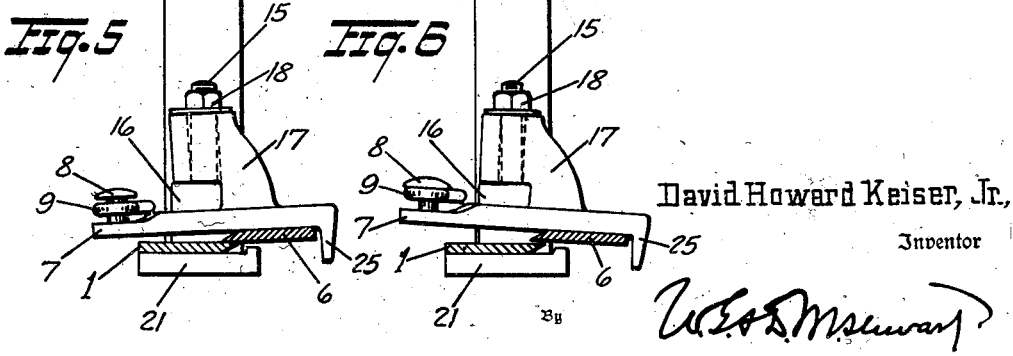
David Howard Keiser, Jr.,
Inventor Patented May 5, 1942

UNITED STATES PATENT OFFICE 2,281,977

PIVOTAL CONNECTION FOR SHEARS

David Howard Keiser, Jr., Wyomissing Hills, Pa.

Application October 16, 1939, Serial No. 299,638

2 Claims. (Cl. 30—248)

My invention relates to shears, and more particularly to a new and improved pivotal connection of their blades, my object being to provide a non-binding pivotal connection insuring a proper cooperating pressure engagement of the blade cutting edges during their closing movements with relief of such pressure during their opening movements, so as to reduce wear and prevent binding and clogging of the blades.

My invention is more particularly applicable to the type of shears commonly known as clipper grass shears, in which one cutting blade is fixed and the other blade movable, and the nature of my improvements and their manner of operating will be more fully described in relation to such type of shears and in connection with the accompanying drawing, the novel features being specifically set forth in the appended claims.

Fig. 1 is a plan view of clipper grass shears embodying my invention.

Fig. 2 is a side elevation of the same.

Fig. 3 is a separate plan view of the movable blade member.

Fig. 4 is a separate side elevation of the fixed blade member and its rigid handle extension, also showing the movable handle member pivotally mounted thereon.

Fig. 5 is a cross sectional view on the line 5—5 of Fig. 1, showing the canting of the pivotal connection during blade closing movements.

Fig. 6 is a cross sectional view similar to Fig. 5 but showing the free movement of the blades during their opening movements.

While the preferred type of shears shown in the drawings has handles operating in a plane perpendicular to the horizontal plane of movement of the blades, this is not essential, and any other known suitable operating means may be used, the present invention relating essentially to the novel pivotal connection of the blades and the resulting improved cutting action.

As shown in the drawing, the fixed blade 1 has a rigid connection to a handle member 2, to which a movable handle member 3 is pivotally connected at 4, biased by spring 5 against closing together movement. Movable blade 6 has a rigid lateral operating extension 7, provided with a pivot stud 8 for a link rod 9, the other end of which engages an angle bracket 10 pivotally mounted at 11 on movable handle member 3. The above described construction, or substantial equivalents, are old and merely indicative of the type of shears shown, and blades 1 and 6 have opposedly bevelled sides forming conventional cooperating cutting edges as shown, blade 6 desirably having, as seen in Fig. 2, a usual curvature insuring better cutting action as heretofore and well known.

My invention relates to a new and improved pivotal connection of blades of the nature shown at 1 and 6 in the drawing. Heretofore such pivotal connection has commonly consisted of a screw, or bolt and nut, exerting a clamping-together stress of the blades to securely retain them in operative position throughout the progressive contact of the blade edges. Such clamping stress is constant during both opening and closing movements of the blades, causing friction, wear, and a tendency to clogging of the shears by uncut material caught between the blades.

It is the object of my invention to overcome the above stated faults which reduces the efficiency of the shears and increase the force necessary to operate them, and my improved pivotal connection, as shown in the drawing is provided for: By a pivot post 15 projecting vertically from a boss 16 forming part of the handle 2 which rigidly carries fixed blade 1; and by a cooperating pivot ear 17 formed as a rigid part of movable blade 6, and raised above the horizontal plane of the latter, as shown; a cap nut 18 loosely retaining said ear 17 on post 15. Pivot ear 17 and operating extension 7 are conveniently made as a single unit, with separately formed blade 6 rigidly connected thereto as by rivets 20 or the like. Blade 1 is also conveniently made separately and united to extension 21 of handle 2, as by rivets 22 or the like. A stop 25 on unit 7—17 limits the closing movement of blade 6 by contacting blade 1 or extension 21, and its opening movement is determined by the limited swing of handle 3 on its pivotal mounting 4.

Boss 16 spaces pivot post 15 well above the level of blade 1, and pivot ear 17 engaged on said post, operates therefore, in a plane at a higher level than the horizontal plane in which the blades move, or in which operating extension 7 swings. Ear 17 desirably loosely engages post 15, and cap nut 18 merely retains said ear from unintentional displacement, and it is not intended or desired that it exert any clamping pressure on said ear, and the blades 1 and 6 may be free of contact except during their cutting cooperation.

In operation the blade 6 is moved toward blade 1 by action of handle member 3 through its connections, bracket 10 and link 9 to pivot stud 8 on blade extension 7, and reverse movement of said blade 6 is provided for by the bias of spring 5, as readily seen in the drawing, and the improved cutting action of said blades may be understood by reference to Figs. 5 and 6, which are naturally exaggerated to more clearly set forth the essential operations.

Referring particularly to Fig. 5, it will be seen, that due ot the relatively loose fit of ear 17 on post 15, and the force exerted by link 9 on pivot stud 8 of extension 7, acting at a lateral distance from said post and in a plane well below the plane of swing of said pivot ear, a canting of said ear results, thus inclining blade 6 at an angle to engage only its cutting edge with blade 1, the continued pull of link 9 thus acting to maintain such blade in tilted position throughout its closing movement, insuring a desirable cutting pressure for best operation, with a minimum of friction and wear. The pull exerted by the movable handle 3, may readily build up a blade cutting edge pressure in excess of that of any heretofore known clamping type of pivotal connection, and such pressure is determined and responsive solely to the needs of the particular cutting operation, increasing when needed and decreasing when not needed. Fig. 6 shows the reverse movement of blade 6, as effected by spring 5, and it will be noted blade 6 is now tilted reversely so its cutting edge is practically free of contact with blade 1, insuring frictionless movement without clogging tendency on any uncut material lying between the blades, which freedom occurs irrespective of the pressure exerted during the blade closing movements.

From the foregoing description of the construction shown in the drawing, it is believed the nature of my improved pivotal connection may be readily understood, as well as the advantages resulting therefrom of an assured cutting efficiency free of binding or clogging, and with a minimum of friction and wear, and less tiresome to operate. The particular construction shown and described may of course be modified or changed within the scope of my invention as set forth in the following claims.

What I claim:

1. In shears having a fixed blade and a movable blade, a non-binding pivotal connection for said blades comprising a spacing boss and vertical pivot post on the fixed blade, a pivot ear for the movable blade spaced above the horizontal plane of the latter and having a relatively loose unclamped fit on said pivot post, and an operating arm for said movable blade extending laterally therefrom in the horizontal plane of said blade and acting to cant said pivot ear so as to tilt the cutting edge of said movable blade in one direction during blade closing together movements, and in a reverse direction during blade opening movements.

2. In shears having a fixed blade and a movable blade, a non-binding pivotal connection for said blades, comprising a pivot post on one blade, a pivot ear on the other blade having a loose cantable fit on said pivot post, and a laterally extended operating arm for the movable blade acting to cant its pivotal connection during closing movement of said blades so as to engage the blade cutting edges, and to reversely cant said pivotal connection during blade opening movement so as to disengage said blade cutting edges.

DAVID HOWARD KEISER, Jr.